(12) United States Patent
Chen et al.

(10) Patent No.: US 6,944,014 B2
(45) Date of Patent: Sep. 13, 2005

(54) DETACHABLE PERSONAL COMPUTER

(75) Inventors: Ching-Jou Chen, Taipei (TW); Tzu-Wei Lai, Taipei (TW); Carl Huang, Taipei (TW); Eric Wang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 168 days.

(21) Appl. No.: 10/628,445

(22) Filed: Jul. 29, 2003

(65) Prior Publication Data

US 2004/0160738 A1 Aug. 19, 2004

(30) Foreign Application Priority Data

Feb. 19, 2003 (TW) .................................. 92202605 U

(51) Int. Cl.[7] .............................................. G06F 1/16
(52) U.S. Cl. ...................... 361/683; 361/681; 361/686
(58) Field of Search ................................ 361/381, 680, 361/681, 683, 686

(56) References Cited

U.S. PATENT DOCUMENTS 6,078,495 A * 6/2000 Cipolla et al. .............. 361/680
6,493,220 B1 * 12/2002 Clark et al. ................. 361/686

* cited by examiner

Primary Examiner—Yean-Hsi Chang
(74) Attorney, Agent, or Firm—Bacon & Thomas, PLLC

(57) ABSTRACT

A detachable personal computer is constructed to include a protective panel, a support arm pivoted to the protective panel and moved in and out of a receiving recess in the base of the protective panel, a keyboard coupled to the protective panel and moved in and out of a keyboard mounting opening in the protective panel, and a tablet PC detachably coupled to the protective panel and adjustably supported on the protective panel in any one of a series of tilted positions by the support arm.

4 Claims, 4 Drawing Sheets

DETACHABLE PERSONAL COMPUTER

BACKGROUND OF THE INVENTION

1. Field of the Invention

The present invention relates to personal computers and, more particularly, to a detachable personal computer formed of a protective panel, a detachable tablet PC, and a detachable keyboard.

2. Description of Related Art

Following fast development of information products, the outer appearance designs of information products are required to be thinner, shorter, and smaller to fit limited table top space.

The housing of the mainframe of a conventional vertical table top computer occupies too much table top space, and thus is not suitable for use on a desk. A tablet PC is compact, requiring less table top space. However, it is not convenient to use a tablet PC on the table. Further, a tablet PC is not practical for keyboard input.

Therefore, it is desirable to provide a detachable personal computer that eliminates the aforesaid drawbacks.

SUMMARY OF THE INVENTION

The present invention provides a detachable personal computer, which is the combination of a tablet PC, a protective panel, a support arm, and a keyboard.

The present invention also provides a detachable personal computer, which has means to adjustably support the tablet PC in one of a series of tilted positions.

The detachable personal computer of the present invention is comprised of a protective panel, a support arm, a keyboard, and a tablet PC. The protective panel comprises a base, a first extension and a second extension respectively extended from the base, a keyboard mounting opening defined between the first extension and the second extension, at least one first flexible retainer and at least one second flexible retainer, and a receiving recess located on the base. The support arm is coupled to the receiving recess and movable in and out of the receiving recess, having a bottom side pivoted to one side of the receiving recess by a pivot and a top side. The keyboard is movably coupled to the keyboard mounting opening of the protective panel. The tablet PC is detachably coupled to the protective panel, having a front side, a back side, a plurality of peripheral sides, and an engagement structure formed in the back side and adapted to receive the top side of the support arm.

The tablet PC can be used independently, or attached to the protective panel for use with the keyboard. Further, the keyboard can be received inside the keyboard mounting opening of the protective panel, and the tablet PC can be closely attached to the protective panel and secured in the received position by the first and second flexible retainers after the support arm has been received in the receiving recess of the protective panel. By means of the engagement structure, the tablet PC can be supported on the support arm and held above the protective panel in one of a series of tilted positions.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
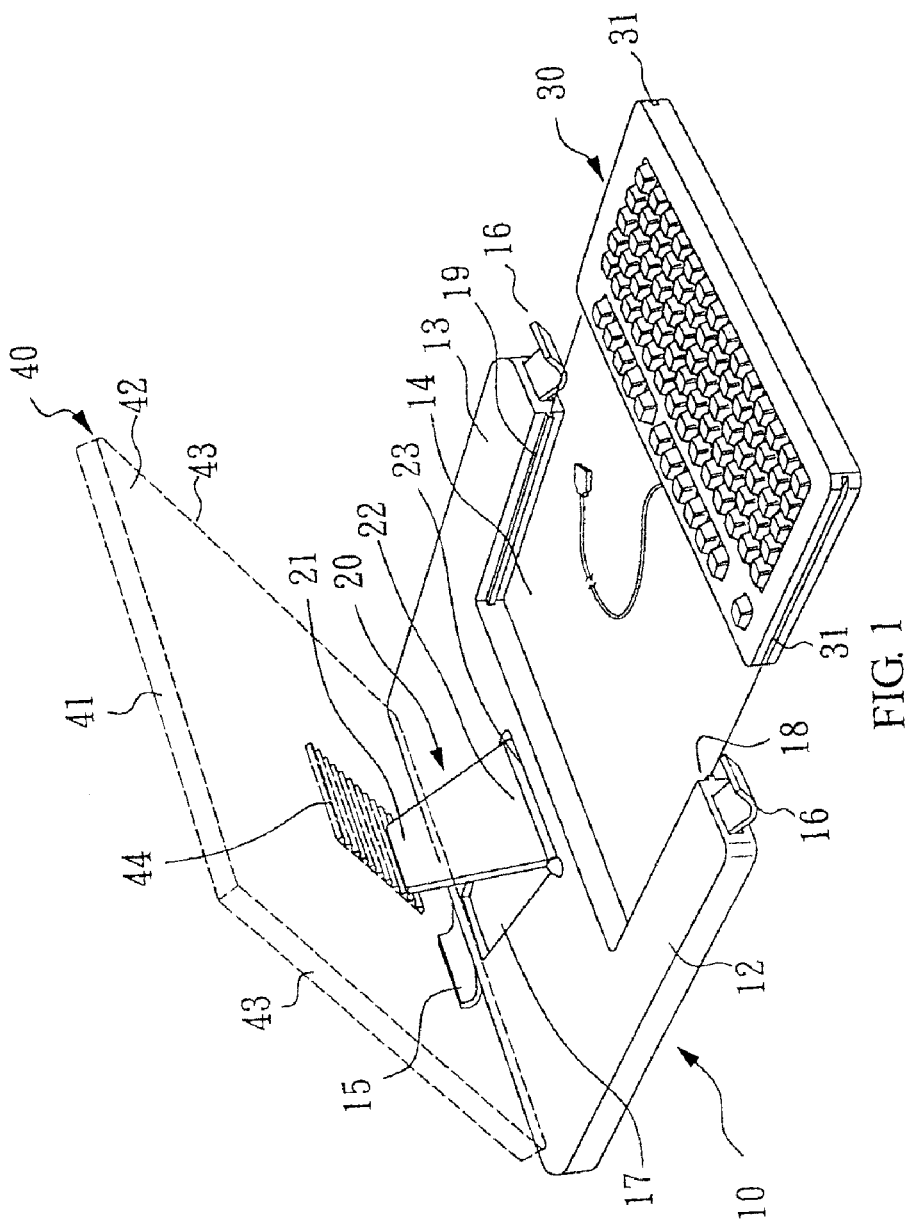
FIG. 1 is an exploded view of a detachable personal computer according to the present invention.
Figure 2:
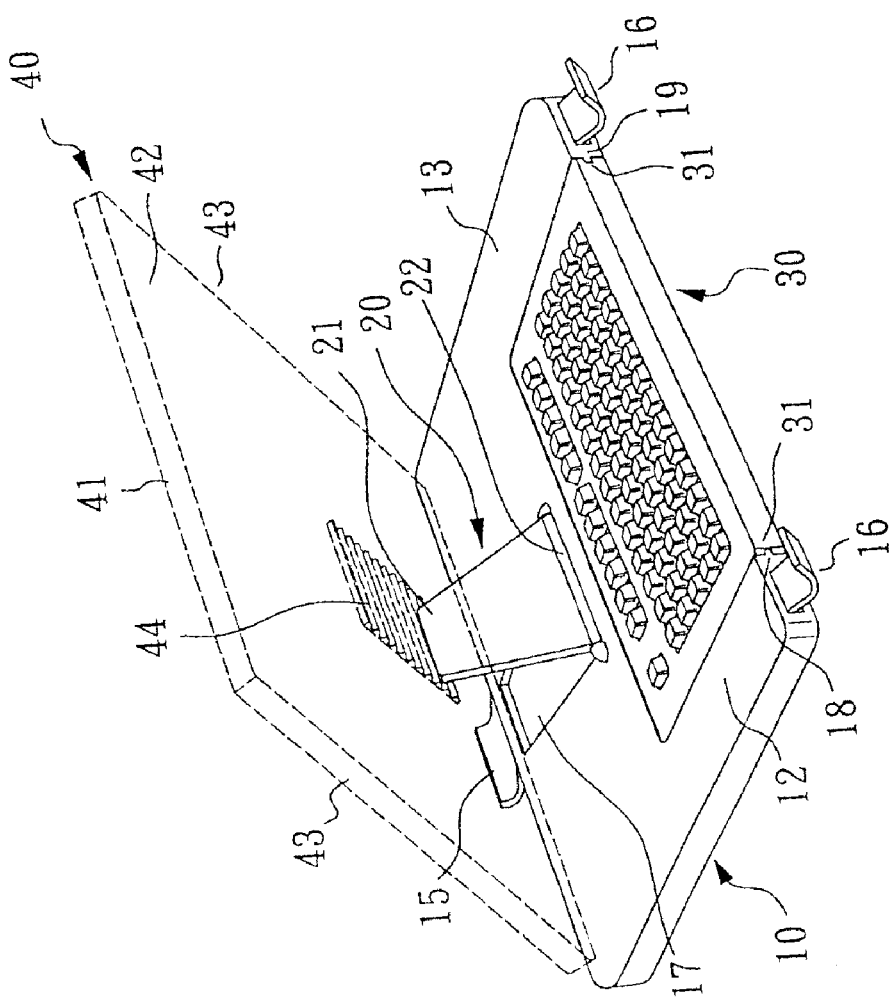
FIG. 2 is an assembly view of FIG. 1.
Figure 3:
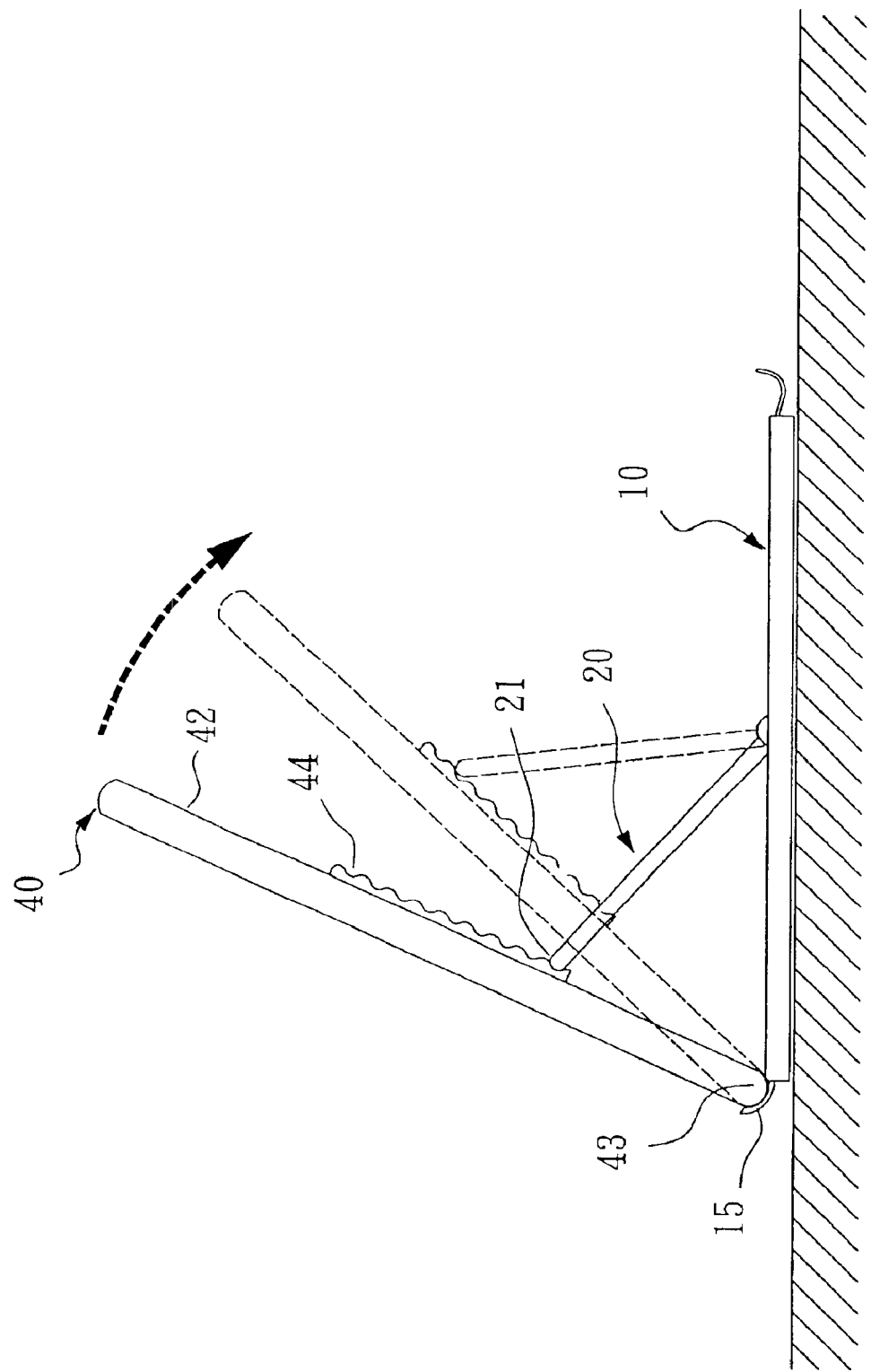
FIG. 3 is a schematic drawing of the present invention, showing the tilting angle adjusting action of the tablet PC.

Referring to FIG. 1, a detachable personal computer in accordance with the preferred embodiment of the present invention is shown comprised of a protective panel 10, a support arm 20, a keyboard 30, and a tablet PC 40.

The protective panel 10 comprises a base 11, a first extension 12, a second extension 13, a keyboard mounting opening 14, a first flexible retainer 15, and two second flexible retainers 16. The base 11 has a receiving recess 17. The first flexible retainer 15 is located on the base 11. The two second flexible retainers 16 are respectively located on the first extension 12 and the second extension 13. The keyboard mounting opening 14 is defined between the first extension 12 and the second extension 13.

The support arm 20 is movably coupled to the receiving recess 17 of the base 11 of the protective panel 10. The support arm 20 has a top side 21 and a bottom side. The bottom side 22 of the support arm 20 is pivotally fastened to the receiving recess 17 of the base 11 of the protective panel 10 by a pivot 23.

The thickness of the keyboard 30 is approximately equal to the thickness of the protective panel 10. The keyboard 30 is movably coupled to the keyboard mounting opening 14 in the base 11 of the protective panel 10, forming the protective panel 10 a rectangular plate.

The tablet PC 40 is detachably coupled to the protective panel 10, having a front side 41, a back side 42, a plurality of peripheral sides 43, and an engagement structure 44 at the back side 42.

The independent operation of the tablet PC 40 is of the known techniques. No further detailed description is necessary in this regard. The other features of the present invention are outlined hereinafter with reference to FIGS. 1~4. The keyboard 30 has two coupling grooves 31 at two sides. The protective panel 10 has a first sliding rail 18 and a second sliding rail 19 respectively located on the first extension 12 and the second extension 13 at two sides of the keyboard mounting opening 14. By means of coupling the coupling grooves 31 to the sliding rails 18 and 19, the keyboard 30 is coupled to the protective panel 10. When coupled, the keyboard 30 can be moved in and out of the keyboard mounting opening 14. Through the protective panel 10, the keyboard 30 and the tablet PC 40 are coupled together for convenient use.

Referring to FIGS. 2 and 3 again, one peripheral side 43 of the tablet PC 40 is fastened to the first flexible retainer 15, and the top side 21 of the support arm 20 is forced into engagement with the engagement structure 44 of the tablet PC 40 to support the tablet PC 40 on the protective panel 10 in a tilted position. According to this embodiment, the engagement structure 44 of the tablet PC 40 is a rack so that the support arm 20 can engage the rack 44 in one of a series of positions to support the tablet PC 40 in any one of a series of tilted positions.

Figure 4:
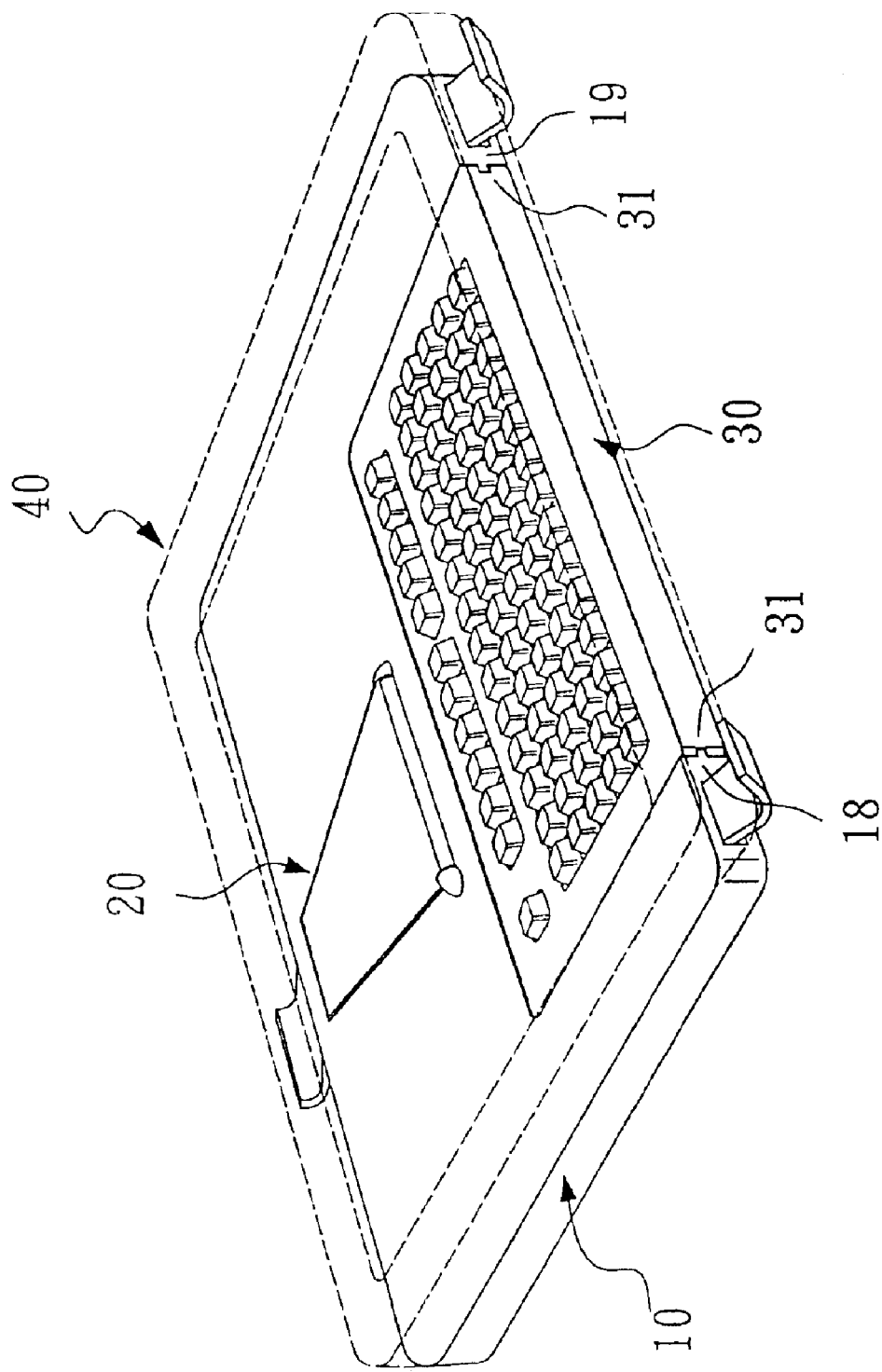
FIG. 4 is an elevational view of the present invention, showing the received status of the detachable personal computer.

When receiving the detachable personal computer, as shown in FIGS. 1 and 4, the keyboard 30 can be pushed into the inside of the keyboard mounting opening 14 in the protective panel 10, and then the support arm 20 is disengaged from the engagement structure 44 of the tablet PC 40 and then the support arm 20 is the fitted in the receiving recess 17 of the base 11 of the protective panel 10. The flexible retainers 15 and 16 of the protective panel 10 are used to secure the received tablet PC 40 in position.

A prototype of the detachable personal computer has been constructed with the features of FIGS. 1~4. The detachable personal computer functions smoothly to provide all of the features discussed earlier.

Although a particular embodiment of the present invention has been described in detail for purposes of illustration, various modifications and enhancements may be made without departing from the spirit and scope of the invention. Accordingly, the invention is not to be limited except as by the appended claims.

What is claimed is:

1. A detachable personal computer comprising:
    a protective panel, said protective panel comprising a base, a first extension and a second extension respectively extended from said base, a keyboard mounting opening defined between said first extension and said second extension, a first flexible retainer and at least one second flexible retainer, and a receiving recess located on said base;
    a support arm coupled to said receiving recess and movable in and out of said receiving recess, said support arm having a bottom side pivoted to one side of said receiving recess by pivot means and a top side;
    a keyboard movably coupled to the keyboard mounting opening of said protective panel; and
    a tablet PC detachably coupled to said protective panel, said tablet PC having a front side, a back side, a plurality of peripheral sides, and an engagement structure formed in said back side and adapted to receive the top side of said support arm, wherein:
    said tablet PC has one peripheral side thereof fastened to the first flexible retainer at the base of said protective panel; and the top side of said support arm is engageable into the engagement structure of said tablet PC and to support said tablet PC on said protective panel in a tilted position; and
    said tablet PC has one peripheral side thereof fastened to the first flexible retainer at the base of said protective panel; and the top side of said support arm is engageable into the engagement structure of said tablet PC and to support said tablet PC on said protective panel in a tilted position.

2. Detachable personal computer as claimed in claim 1, wherein the quantity of said at least one second flexible retainer is two, and said two second flexible retainers are respectively located on said first extension and said second extension.

3. The detachable personal computer as claimed in claim 1, wherein said tablet PC has the back side thereof attached to said protective panel and is secured in position by said at least one first flexible retainer and said at least one second flexible retainer when said support arm received in said receiving recess.

4. The detachable personal computer as claimed in claim 1, wherein said keyboard comprises two coupling grooves respectively defined in two sides of said keyboard; said protective panel comprises two sliding rails respectively located on said first extension and said second extension at two sides of said keyboard mounting opening for engaging the coupling grooves of said keyboard.

\* \* \* \* \*